United States Patent [19]
Reiner

[11] Patent Number: 5,955,723
[45] Date of Patent: Sep. 21, 1999

[54] CONTACTLESS CHIP CARD

[75] Inventor: Robert Reiner, Unterhaching, Germany

[73] Assignee: Siemens Aktiengesellschaft, Munich, Germany

[21] Appl. No.: 08/963,183

[22] Filed: Nov. 3, 1997

Related U.S. Application Data

[63] Continuation of application No. PCT/DE96/00359, Feb. 29, 1996.

[51] Int. Cl.$^6$ .............................. G06K 7/08; G06K 19/00
[52] U.S. Cl. ............................................ 235/492; 235/451
[58] Field of Search .................................. 235/492, 384, 235/451

[56] References Cited

U.S. PATENT DOCUMENTS

| | | | |
|---|---|---|---|
| 4,692,604 | 9/1987 | Billings | 235/493 |
| 4,857,893 | 8/1989 | Carroll | 340/572 |
| 4,890,111 | 12/1989 | Nicolet et al. | 340/825.54 |
| 4,960,983 | 10/1990 | Inoue | 235/449 |
| 5,015,834 | 5/1991 | Suzuki et al. | 235/493 |
| 5,111,199 | 5/1992 | Tomoda et al. | 340/825.72 |
| 5,412,192 | 5/1995 | Hoss | 235/380 |
| 5,491,483 | 2/1996 | D'Hont | 342/42 |
| 5,498,859 | 3/1996 | Farmont | 235/384 |
| 5,640,004 | 6/1997 | Mardinian et al. | 235/492 |
| 5,698,837 | 12/1997 | Furuta | 235/492 |

FOREIGN PATENT DOCUMENTS

| | | |
|---|---|---|
| 0505905A1 | 9/1992 | European Pat. Off. . |
| 3721822C1 | 11/1988 | Germany . |
| 4308193A1 | 9/1994 | Germany . |
| 9100176 | 3/1992 | Netherlands . |
| 9100347 | 3/1992 | Netherlands . |

Primary Examiner—Thien Minh Le
Assistant Examiner—Daniel Sherr
Attorney, Agent, or Firm—Herbert L. Lerner; Laurence A. Greenberg

[57] ABSTRACT

A data carrier configuration includes a semiconductor chip. A first conductor loop is connected to the semiconductor chip and has at least one winding and a cross-sectional area with approximately the dimensions of the semiconductor chip. At least one second conductor loop has at least one winding, a cross-sectional area with approximately the dimensions of the data carrier configuration and a region forming a third loop with approximately the dimensions of the first conductor loop. The third loop inductively couples the first conductor loop and the at least one second conductor loop to one another. The first and third conductor loops are disposed substantially concentrically.

5 Claims, 1 Drawing Sheet

CONTACTLESS CHIP CARD

CROSS-REFERENCE TO RELATED APPLICATION

This application is a continuation of International Application Serial No. PCT/DE96/00359, filed Feb. 29, 1996.

BACKGROUND OF THE INVENTION

Field of the Invention

The invention relates to a contactless chip card.

Chip cards, that is to say plastic cards which contain a semiconductor chip, are nowadays mostly of a contact-dependent structure. In order to use the chip card, it has to be inserted into a reader, which establishes an ohmic contact for communication between a terminal and the card.

However, contactless chip cards have also already become known and are also already in use. In the case of such cards, contact with a terminal takes place through a capacitive or inductive coupling, that is to say through an electric or magnetic component of an electric magnetic field. The inductive coupling is preferably used in that case.

In the case of an inductive coupling, a certain minimum coupling factor between a coil of the chip card and a coil of the terminal is necessary. The coupling factor depends on the size of the terminal coil, the distance of the card from the latter, the relative position in relation to the latter and the size of the coil in the card. The larger the coil in the card, the generally greater the coupling factor. Therefore, it is generally desired to make the coil in the card as large as possible. However, the coil has to be electrically connected to the chip in the chip card. In such cases a coil with a large surface area leads to technically complex assembly solutions, but in particular to difficult handling during transport. It would be much more simple to produce and handle small coils which are about the size of the conventional contact modules of the contact-dependent chip cards. However, if that were the case the coupling factor at a given distance would be significantly less or, for the same coupling factor, the range would be considerably reduced.

A chip card which is known from Published Netherlands Patent Application NL 9100347 has a semiconductor chip that is connected to a first conductor loop having at least one winding. The cross-sectional area of the loop has approximately the same dimensions as the semiconductor chip. Moreover, the data carrier configuration has at least one second conductor loop with at least one winding, a cross-sectional area with approximately the same dimensions as the data carrier configuration and a region which forms a third loop with approximately the same dimensions as the first conductor loop. The first and second conductor loops are coupling inductively to one another through the third conductor loop.

However, in that device, the first and third conductor loops are connected to one another through a magnetic yoke, which entails complicated and therefore expensive mounting of the semiconductor chip in the card.

SUMMARY OF THE INVENTION

It is accordingly an object of the invention to provide a portable data carrier configuration, in particular a chip card, which overcomes the hereinafore-mentioned disadvantages of the heretofore-known devices of this general type.

With the foregoing and other objects in view there is provided, in accordance with the invention, a data carrier configuration comprising a semiconductor chip having given dimensions; a first conductor loop connected to the semiconductor chip, the first conductor loop having at least one winding and a cross-sectional area with approximately the given dimensions; at least one second conductor loop having at least one winding, a cross-sectional area with approximately the dimensions of the data carrier configuration and a region forming a third loop with approximately the given dimensions; the third loop inductively coupling the first conductor loop and the at least one second conductor loop to one another; and the first and third conductor loops disposed substantially concentrically.

In accordance with another feature of the invention, there is provided a carrier element carrying the semiconductor chip, the first conductor loop disposed on the carrier element.

In accordance with a further feature of the invention, the first conductor loop is disposed on the semiconductor chip.

In accordance with an added feature of the invention, the first conductor loop and the at least one second conductor loop have different numbers of windings.

In accordance with a concomitant feature of the invention, the conductor loops have inductances to be used in frequency filters.

In the data carrier configuration of the invention, the large coil has a high coupling factor with regard to the terminal coil. Currents are therefore induced therein that can induce currents in the small coil through the local inductive coupling. The small coil can easily be produced by a chip or module manufacturer and integrated into a carrier module. The coil is already realized on the semiconductor chip in an especially advantageous way, for instance through the use of aluminum tracks which are applied there.

The large coil can easily be integrated on or into the card by card manufacturers. For instance, it can be produced in the form of a planar coil by printing techniques. This eliminates a problem in transportation in which the large coil can become deformed, causing its properties, especially its quality and inductance, to change.

An essential provision for a good coupling factor between the large and the small coil of the data carrier configuration is a region of the greatest possible length in which the leads of the coils extend at the slightest possible spacing from one another and couple inductively well there. According to the invention, this is accomplished due to the fact that the large coil, that is the second conductor loop, forms a small loop which has approximately the dimensions of the small coil, that is of the first conductor loop. This small loop can be made either with or without crossovers. However, it is also possible to form the coupling region of the two conductor loops, that is to say of the large loop and the small loop, in a meandering form, in order to make it as long as possible.

If, for example, the input resistance of the semiconductor chip has to be adapted to the terminal, it is possible in an advantageous way to provide different numbers of turns of the small coil and the large coil or else only in the case of the small loop of the large coil, so that a transformation takes place.

However, there are also different variations of the way in which the coupling loop can be configured, for example as a resonant circuit including an inductance and a capacitor. All of the variants can be produced therewith: a closed resonant circuit is suitable for inductive coupling to a terminal, an open resonant circuit is suitable for capacitive coupling. For higher frequencies, a coupling loop becomes an antenna. It is possible to deliberately utilize the resonance of the coupling loop.

Other features which are considered as characteristic for the invention are set forth in the appended claims.

Although the invention is illustrated and described herein as embodied in a contactless chip card, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Referring now in detail to the figures of the drawings as a whole, it is seen that only conductor loops or coils and a semiconductor chip are represented, in a diagrammatic manner. In the representation chosen, a first conductor loop 2, that is to say a small coil, is always disposed around a semiconductor chip 1, and may be disposed, for example, on a non-illustrated carrier element, together with the semiconductor chip 1. However, it is also possible to provide the small coil 2 directly on the semiconductor chip 1, which would make handling even easier.

Figure 1:
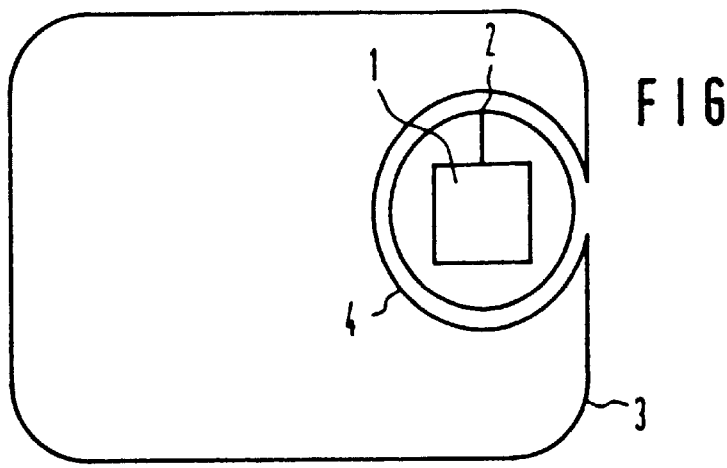
FIG. 1 is a diagrammatic, plan view of a chip and coils of a first portable data carrier configuration according to the invention.
Figure 2:
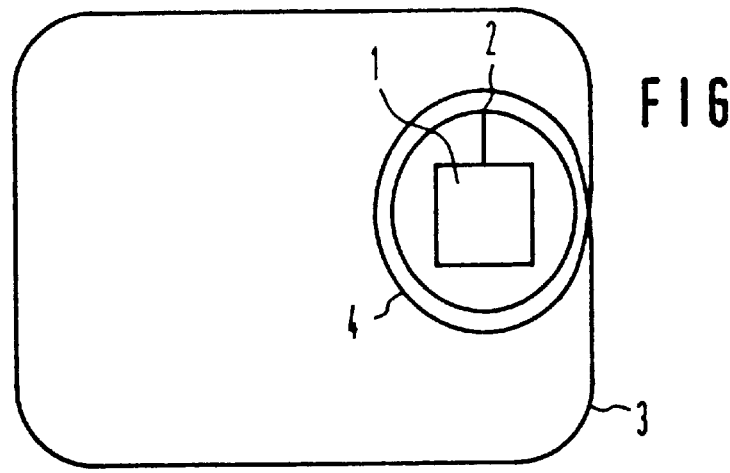
FIG. 2 is a plan view of a second embodiment of the coils.

FIGS. 1 and 2 illustrate that a large coil, that is to say a second conductor loop 3, has approximately the dimensions of a chip card. For example, the second conductor loop 3 may be disposed by the card producer in or on the chip card as a planar coil through the use of a printing technique. The second conductor loop 3 forms a small loop 4, which runs at a small distance from the small coil 2. In this case the small loop 4 may run inside or outside as well as above or below the small coil.

FIG. 1 illustrates a way of forming the small loop 4 of the large coil 3 without any crossovers, whereas FIG. 2 illustrates a small loop 4 having a crossover. In such a case it would be possible to provide the loop 4 with more or less turns than the large conductor loop 3. In a realization according to the invention with a small coil 2 and a large coil 3, it is possible at any time to provide the two coils 2, 3 with different numbers of turns, in order to thereby permit a transformation, for example for impedance matching.

Figure 3:
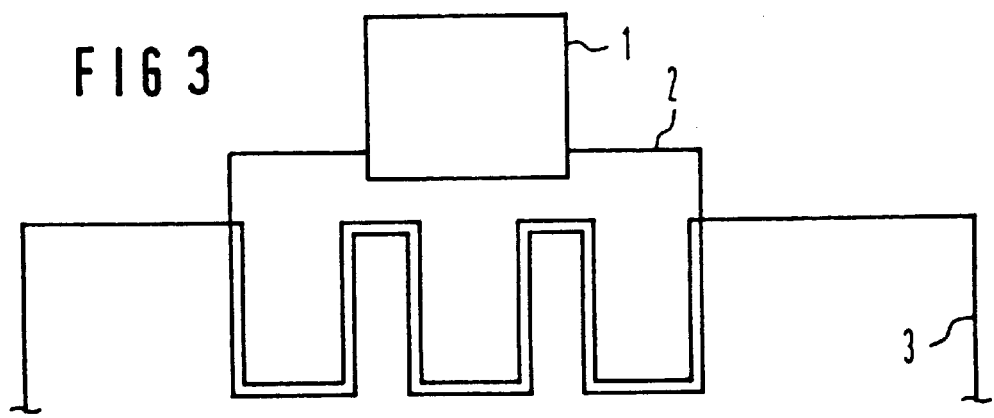
FIG. 3 is a plan view showing a meandering path of a coupling region of the coils.

FIG. 3 shows a further possible configuration of a coupling region between a small conductor loop 2 connected to a semiconductor chip 1, and a large conductor loop 3. In this case, the coupling region has a meandering path, in order to obtain as long a length of the coupling region as possible. The realization of a portable data carrier configuration with a first conductor loop and a second conductor loop which are constructed as small and large coils is not necessarily confined to a card form. Such a configuration according to the invention is of course possible in the case of any data carrier configuration in which the latter is larger than the semiconductor chip.

I claim:

1. In a data carrier configuration having predetermined dimensions, the improvement comprising:

a semiconductor chip having given dimensions;

a first conductor loop connected to said semiconductor chip, said first conductor loop having at least one winding and a cross-sectional area with approximately the given dimensions;

at least one second conductor loop having at least one winding, a cross-sectional area with approximately the predetermined dimensions and a region forming a third loop with approximately the given dimensions;

said third loop inductively coupling said first conductor loop and said at least one second conductor loop to one another; and said first and third conductor loops disposed substantially concentrically.

2. The data carrier configuration according to claim 1, including a carrier element carrying said semiconductor chip, said first conductor loop disposed on said carrier element.

3. The data carrier configuration according to claim 1, wherein said first conductor loop is disposed on said semiconductor chip.

4. The data carrier configuration according to claim 1, wherein said first conductor loop and said at least one second conductor loop have different numbers of windings.

5. The data carrier configuration according to claim 1, wherein said conductor loops have inductances to be used in frequency filters.

* * * * *

UNITED STATES PATENT AND TRADEMARK OFFICE
CERTIFICATE OF CORRECTION

PATENT NO : 5,955,723
DATED      : September 21, 1999
INVENTOR(S) : Robert Reiner It is certified that error appears in the above-identified patent and that said Letters Patent is hereby corrected as shown below:

On the title page, item

Item [30] should be inserted as follows:

May 3, 1995        [DE]        Germany ..... 195 16 227.7

Signed and Sealed this

Second Day of May, 2000

Attest:

Q. TODD DICKINSON

*Attesting Officer*                *Director of Patents and Trademarks*